United States Patent Office 3,535,612
Patented Oct. 20, 1970

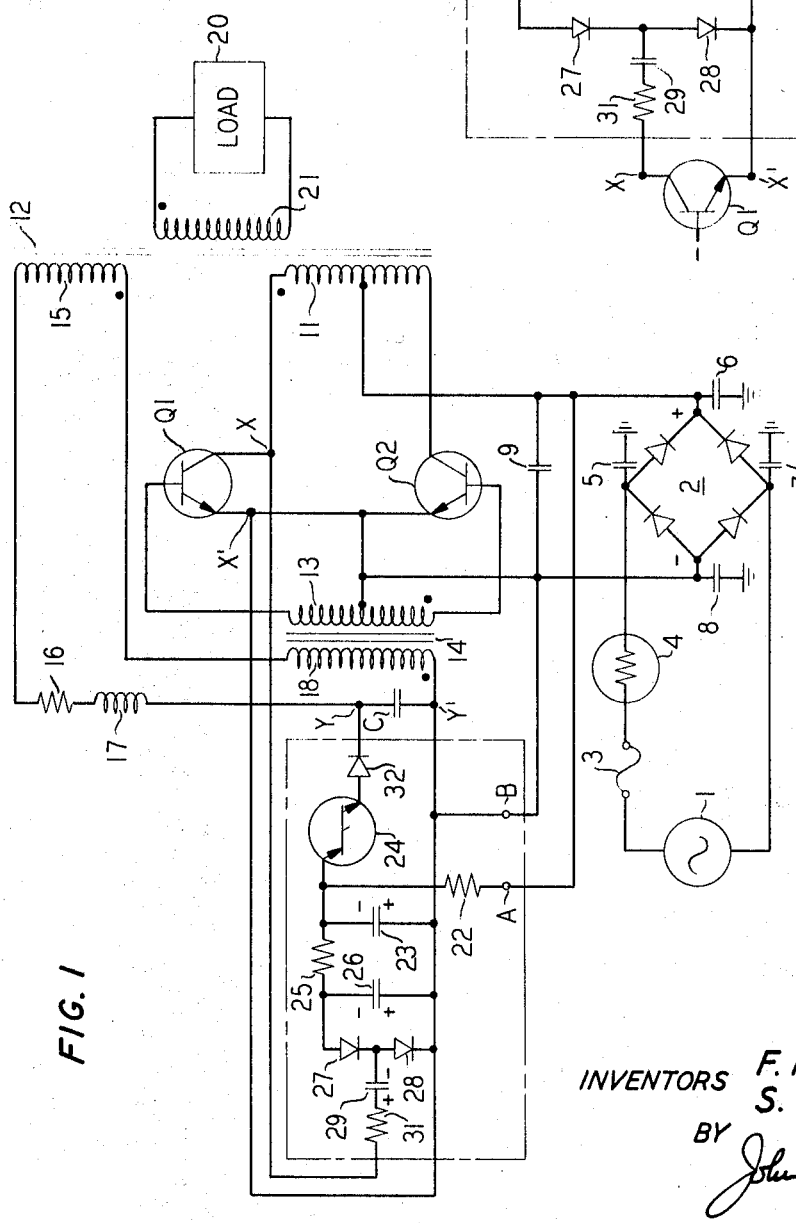

3,535,612
INVERTER STARTING CIRCUIT
Frank F. Judd, Madison, and Stanley Raber, Rockaway Township, Morris County, N.J., assignors to Bell Telephone Laboratories, Incorporated, Murray Hill and Berkeley Heights, N.J., a corporation of New York
Filed Dec. 17, 1968, Ser. No. 784,412
Int. Cl. H02m 7/52, 1/18; H03b 3/281
U.S. Cl. 321—45                                    6 Claims

ABSTRACT OF THE DISCLOSURE

A starting network is connected both across the collector-emitter path of one of the inverter transistors and to the feedback loop of the inverter to supply a continuous train of starting pulses to the feedback loop and thus reliably start the inverter under all load conditions. Once the inverter has started, the starting network is electrically disconnected from the inverter feedback loop so as not to interfere with the normal operation of the inverter. In the event that oscillation in the inverter should later terminate for one reason or another, the train of starting pulses is automatically reapplied to the feedback loop to again start the inverter. The starting network may be modified to provide bursts of starting pulses, rather than a continuous train of starting pulses, in applications where the possibility of load short-circuiting exists.

BACKGROUND OF THE INVENTION

This invention relates to D.C. to A.C. inverter circuits and, more particularly, to D.C. to A.C. inverter starting circuits.

Inverters are generally used to change a direct current input to an alternating current output which can be stepped up or down by a transformer and, if desired, then rectified to obtain a D.C. level higher or lower than the input D.C. level. The inverters usually employ a pair of alternately conducting transistors connected to pass current from the source to the load in respectively opposite directions. A regenerative feedback path is provided from the inverter output to the base-emitter path of each of the transistors to maintain continuous oscillation. Transformer or transistor saturation characteristics or separate timing components in the positive feedback path control the switching or oscillating frequency of the inverter.

Inherent differences in the otherwise symmetrical circuit parameters, e.g., the transistors, are not usually sufficient to start oscillation in an inverter circuit. In the prior art, starting networks such as resistor or resistor-capacitor networks have been employed to supply a continuous starting current to the inverter to create a circuit unbalance that insures both the initiation and continuity of oscillation in the inverter. The application of a continuous starting current to create an asymmetrical condition, however, interferes with the normal symmetrical operation of the circuit and, because of the continuous dissipation of power in the starting elements, reduces the efficiency of inversion. Moreover, since in the event of a short circuited load a self-excited inverter normally ceases to oscillate, the uncontrolled application of starting bias by the prior art circuits often results in heating damage to the inverter parameters.

In an attempt to eliminate the problems surrounding these starting networks, other prior art circuits apply a single pulse of current to start the inverter with the starting network then electrically disconnected from the inverter. A single pulse of current is, however, often insufficient to start all inverters, notably those supplying heavier loads and those with filter capacitors shunting the load where the filter capacitor must be charged before the inverter is capable of assuming the load. In addition, these prior art circuits often do not provide the desired automatic restart capability.

It is, therefore, an object of this invention to provide an inverter starting network that insures reliable starting and automatic restarting of an inverter circuit under all loads without interfering with the normal operation of the inverter.

It is a further object of the invention to provide an inverter starting network that will not cause damage or destruction to the inverter components in the event of a short-circuited load.

SUMMARY OF THE INVENTION

In the present invention, the starting network is connected both across the collector-emitter path of one of the inverter transistors and to the timing or control feedback loop of the inverter to supply a continuous train of starting pulses to the feedback loop until the voltage across the collector-emitter path of the inverter transistor indicates that the inverter has assumed its normal mode of oscillation. Once oscillation has thus been initiated in the inverter, the starting network electrically disconnects itself from the inverter feedback loop. In the event that oscillation in the inverter should later terminate, the starting network again automatically begins to supply a continuous train of starting pulses to the feedback loop to restart the inverter and then again disconnects itself. The present invention thus automatically achieves starting and restarting of the inverter without interfering with the normal operation of the inverter. In a second embodiment of the invention, a starting network is provided which supplies bursts of starting pulses to the inverter feedback loop so as to provide reliable starting without causing heating damage to the inverter components in the event of a load short-circuit.

BRIEF DESCRIPTION OF THE DRAWINGS

Other objects and features of the present invention will readily be apparent from the following discussion and drawings in which:

FIG. 1 is a schematic embodiment of a starting network employing the present invention which is used in an inverter with a resistor-inductor-capacitor timing or control network in the feedback loop; and FIG. 2 is a second schematic embodiment of an alternate inverter starting network employing the present invention.

DETAILED DESCRIPTION

In the embodiment of the invention illustrated in FIG. 1, a source of A.C. input 1 is connected to the input terminals of a full wave diode bridge rectifier 2 through the series combination of a fuse 3 and thermistor 4. Thermistor 4 is used to prevent excessive in-rush current from flowing when the A.C. line power is applied to the inverter. Once the inverter starts and begins to draw power the resulting current in the thermistor heats it and reduces its impedance. Thermistor impedance is subsequently reduced to a point where the thermistor reaches a steady state temperature. The thermistor is preferably chosen for its low "hot" impedance so as not to add appreciably to the total power dissipation of the power unit under normal operating conditions. Capacitors 5, 6, 7, and 8 are individually connected from separate vertices of bridge rectifier 2 to ground to prevent the input A.C. line voltage high frequency components from being transmitted to the input of the inverter comprising transistors Q1 and Q2. Filter capacitor 9 is connected across the output terminals of bridge rectifier 2.

The inverter portion of the circuit comprises transistors Q1 and Q2 which each have their collector-emitter paths serially connected with individual center-tapped portions of primary winding 11 of transformer 12 and the output terminals of bridge rectifier 2. The base electrodes of transistors Q1 and Q2 are connected by secondary winding 13 of feedback transformer 14. The center-tap of winding 13 is connected to the emitter electrodes of transistors Q1 and Q2 to provide feedback bias to the base-emitter path of these transistors. The timing or frequency control feedback loop of the inverter comprises the serial connection of tertiary feedback winding 15 of transformer 12, resistor 16, inductor 17, capacitor C, and the primary winding 18 of feedback transformer 14. A load to be supplied 20 is connected with the secondary winding 21 of transformer 12.

The inverter starting network shown in the dotted box of FIG. 1 has its input terminals A and B connected to the output terminals of the bridge rectifier 2. Resistor 22 connects the input terminal A to the junction of capacitor 23 and pnpn device 24. Resistor 25 and capacitor 26 are serially connected across capacitor 23. Diodes 27 and 28 are serially connected, and poled for conduction in the same forward direction, across capacitor 26. The series combination of capacitor 29 and resistor 31 is connected from the junction of the cathode of diode 27 and anode of diode 28 to point X at the collector electrode of inverted transistor Q1. The cathode of diode 28 is connected to point X' at the emitter electrode of transistor Q1. As discussed in detail hereinafter, the voltage across the emitter-collector path of transistor Q1 at points X–X' is used to electrically disconnect the starting network once the inverter assumes its normal mode of operation.

The pnpn device 24 is serially connected in its forward conductivity direction with diode 32, also connected in its forward conductivity direction, from the junction of capacitor 23 and resistor 25 to point Y at one terminal of capacitor C. Point X' at the emitter electrode of transistor Q1 is connected to point Y' at the other terminal of capacitor C to complete the connection of the starting network across capacitor C.

Two terminal, four layer semiconductor device 24 is characteristically non-conductive in the forward direction until the potential across the device reaches a predetermined magnitude, inherent to the device, which is sufficient to break down, i.e., initiate current through, the device. Once the device breaks down the voltage across it falls from its relatively large magnitude prior to breakdown to a very small magnitude which for present purposes may be considered negligible. After the device breaks down in the forward direction, it remains in this state as long as a relatively small magnitude current flows through the device. Once the current falls below this small magnitude, forward conduction through the device ceases and the device is once again cut-off. Diode 32 limits the inverse voltage that can appear across the device 24 and blocks the current flow from the timing or control feedback network during normal oscillation of the inverter. The characteristics of a device such as the pnpn device 24 are discussed in detail at pages 460 through 465 in the text "Pulse, Digital and Switching Waveforms," Millman and Taub, copyright 1965, McGraw-Hill, Inc.

When the input A.C. source 1 is applied to the circuit, a filtered D.C. output voltage appears across capacitor 9 connected across the output terminals of the bridge rectifier 2. This output voltage appears at the input terminals A and B of the starting network and charges capacitor 23 through resistor 22. Capacitor 23 quickly charges to a potential greater than the inherent breakdown voltage of the pnpn device 24 and initiates current flow through the device 24 and the diode 32 which is now forward biased. Capacitor 23 then discharges through the low impedance path comprising device 24 and diode 32 to apply a pulse of current through the capacitor C of the control or timing feedback loop of the inverter. This pulse of current charges capacitor C sufficiently to establish ringing voltage and current between inductor 17 and capacitor C. This initial ringing is often sufficient to start the inverter oscillating in its normal mode of oscillation in the manner discussed hereinafter. If the circuit is of a design which does not permit quick starting with a single pulse, or if for some other reason the circuit fails to start, the pnpn device 24 will quickly recover its blocking capability once the capacitor 23 is discharged to a point where it can no longer provide sufficient current to sustain conduction through the device 24.

Once the device 24 recovers its blocking capability, capacitor 23 again charges through, and at a rate determined by, resistor 22 from the D.C. output of the bridge rectifier 2. When capacitor 23 again charges to a potential greater then the inherent breakdown voltage of the pnpn device 24, the device again breaks down and a second pulse of current is supplied to the capacitor C. If this second pulse fails to start the inverter, additional pulses are applied in the same manner at a rate determined by the time constant of resistor 22 and capacitor 23 until the inverter is finally started. A train of pulses may thus be supplied to excite ringing between inductor 17 and capacitor C until the inverter finally has the capability of supplying the load 20 and normal oscillation is begun.

The pulses of current applied across capacitor C in the inverter feedback loop charges the capacitor and causes a current flow in the loop which comprises inductor 17, resistor 16, winding 15 of transformer 12, and winding 18 of transformer 14. As can be seen from the dot convention on transformer 14, the current flow through this series path induces a voltage in winding 13 of transformer 14 which attempts to bias transistor Q1 into conduction while holding transistor Q2 cut-off. Once sufficient starting current thus begins to flow through the base-emitter path of transistor Q1, current flow is also initiated through the collector-emitter path of transistor Q1. Current thus flows from the positive terminal of the bridge rectifier 2 through the upper portion of primary winding 11 and the collector-emitter path of transistor Q1 to the negative terminal of the bridge rectifier and causes a feedback voltage to be induced in winding 15. As can be seen from the dot convention of transformer 12, the voltage induced in winding 15 causes a current flow in the series loop comprising resistor 16, inductor 17, capacitor C, and winding 18 of transformer 14 which biases transistor Q1 further into conduction. Biasing transistor Q1 further into conduction increases its collector-emitter current flow and the accompanying current flow through the upper portion of winding 11 which increases the voltage induced in winding 15 and the current flow in the feedback loop which includes winding 18 of transformer 14. In the manner discussed heretofore, transistor Q1 is thus biased further into conduction which then regeneratively causes more collector-emitter current flow and so on.

This regenerative process then continues until the inherent ringing or oscillatory action of the series resonant network comprising resistor 16, inductor 17, and capacitor C causes the current in the loop comprising windings 15 and 18 to reverse. Reversing the current in the loop biases transistor Q2 into conduction and transistor Q1 into cut-off. The regenerative process discussed heretofore for transistor Q1 then begins for transistor Q2 until the resonant network causes transistor Q1 to again be conductive and transistor Q2 to be cut-off and so on. An alternating voltage is thus induced in winding 21 of transformer 12 to supply the load 20.

When the inverter begins to oscillate in the foregoing mode of operation, a pulsating voltage, which may resemble a square wave, appears across the collector-emitter path of transistor Q1 at points X–X'. This pulsating voltage charges capacitor 29 to a potential having a polarity as shown in the drawing through resistor 31 and diode 28, the latter of which is forward biased by the pulsating voltage. Once transistor Q1 is subsequently biased into conduction in the initial oscillatory course of events discussed heretofore, the capacitor 29 discharges through a path comprising resistor 31, the collector-emitter path of transistor Q1, the capacitor 26, and the diode 27 which is forward biased by the potential stored in capacitor 29. The discharging current from capacitor 29 also flows through capacitor 23 which is connected across capacitor 26 by resistor 25. The discharging energy from capacitor 29 thus charges both capacitors 23 and 26 with a potential the polarity of which is as shown in the drawing. Capacitor 29 continues to discharge until either transistor Q1 is biased into cut-off in the initial oscillatory course of events discussed heretofore or until its stored energy is no longer sufficient to sustain forward conduction through diode 27. As can be seen from the drawing, the potential stored in capacitor 23 has a polarity which is negative at the input terminal of the pnpn device 24. The pnpn device is thus now held firmly in cut-off, pulses which may interfere with normal inverter oscillation are no longer applied to the capacitor C of the feedback timing network, and the starting network is effectively switched or disconnected from the inverter during its normal oscillatory mode of operation.

If for any reason the inverter should cease to oscillate, as for example due to an interruption in the power supplied by the A.C. source 1, the potential stored in capacitor 23 is quickly dissipated in resistor 25 so that the capacitor 23 can quickly charge to a polarity positive at the input terminal of pnpn device 24 to again start the inverter in the manner discussed heretofore. The inverter will thus be automatically restarted and the starting network again disconnect itself from across capacitor C of the timing of control feedback network so as not to interfere with the normal mode of operation of the inverter.

It has been found that under certain conditions the load 20 may be short-circuited without drawing sufficient input current from the A.C. input source 1 to blow the fuse 3. Under these conditions, the inverter can not sustain the load and the oscillatory action of the inverter ceases. In the manner discussed heretofore, the starting network then automatically attempts to restart the inverter by supplying a continuous train of pulses to the capacitor C in the inverter timing or control feedback loop. The inverter then attempts to start in response to these pulses, as was discussed, but now it operates into a shorted load. This can result in excessive internal heating of the inverter components, notably the transistors, and if not corrected could lead to destruction of the transistors. To alleviate this condition, the starting circuit of FIG. 1 may be modified as shown in FIG. 2.

The circuit of FIG. 2 is an alternate embodiment of the starting circuit shown in the dotted box of FIG. 1. As such, the circuit of FIG. 2 may be substituted for the circuit of FIG. 1 as shown in the drawing for applications where the possibility of a load short-circuiting exists. Like components of the circuits of FIGS. 1 and 2 bear the same numerical designations. The starting circuits of FIGS. 1 and 2 differ in that the series resistor-capacitor network 51 and the parallel resistor-capacitor network 52 have been added to the circuit of FIG. 2. Series resistor-capacitor network 51 is connected from the output terminal of the pnpn device 24 to terminal X' at the emitter electrode of inverter transistor Q1, while the parallel resistor-capacitor network 52 is serially connected between the output terminal of the pnpn device 24 and the anode electrode of diode 32. These networks modify the starting network so that it provides starting bias by bursts of starting pulses rather than the continuous application of pulses. The bursts of starting pulses are spaced by intervals predetermined by the parameters of the resistor-capacitor networks 51 and 52. As before, once the inverter is started, the starting network is discontinued. The application of the bursts of pulses rather than a continuous stream of pulses reduces the heating of the inverter parameters under load short-circuit conditions by a factor sufficient to eliminate the heating problem under short-circuit conditions without affecting the starting reliability of the starting network.

When input power is initially applied to the starting network of FIG. 2, elements 22, 23, 24, 25, 26, 27, 28, 29, and 31 function in the same manner as discussed in connection with FIG. 1 to apply starting pulses to the capacitor C of the feedback network. Each time a pulse is supplied to capacitor C in the FIG. 2 starting circuit, the capacitors of the networks 51 and 52 also acquire some small charge which increases the voltage across these capacitors. The potential thus stored in the capacitor of network 51 has a polarity as shown in FIG. 2 of the drawing and acts to back-bias the pnpn device 24. After a given number of starting pulses increases the potential stored in the capacitor of network 51, the potential to which capacitor 23 can charge is no longer sufficient to cause forward breakdown of pnpn device 24. The train of starting pulses supplied to the capacitor C in the manner discussed in connection with FIG. 1 is therefore terminated. The number of starting pulses required to sufficiently raise the potential of the capacitor in network 51 to prevent pnpn device 24 from breaking down is determined by the parameters chosen for networks 51 and 52.

As noted heretofore, during the interval when the capacitor of the series resistor-capacitor network 51 was charging, the capacitor of the parallel resistor-capacitor network 52 is also charging to a potential of a polarity shown in the drawing. One starting pulses cease to be applied through pnpn device 24, the capacitor of network 52 begins to discharge through the resistor of the same network. This capacitor continues to discharge until the potential stored in the capacitor of network 51 is sufficient to overcome the remaining potential stored in the capacitor of network 52 to bias diode 32 into forward conduction. Once diode 32 becomes conductive in the forward direction, the capacitor of network 51 begins to discharge through the timing or control feedback loop. The capacitor of network 51 thus eventually discharges sufficiently to again permit pnpn device 24 to breakdown and supply a burst of starting pulses to the capacitor C to again attempt to start the inverter. The capacitors of networks 51 and 52 now again begin to charge in step fashion until the pnpn device 24 is again cut-off and the burst of starting pulses terminated. The cycle then repeats itself until oscillation is initiated in the inverter in the manner discussed heretofore. Bursts of starting pulses separated by intervals determined by the resistor-capacitor time constant of networks 51 and 52 are thus supplied to the capacitor C of the inverter feedback loop to reliably start the inverter and at the same time prevent heating damage to the parameters of the inverter in the event that the output of the inverter should become short-circuited.

It should be apparent that the present invention is not restricted to inverters employing resistor-inductor-capacitor timing in their feedback loop with starting pulses supplied across the capacitor or to inverters employing a feedback transformer. The prior art abounds with starting circuits wherein starting currents are supplied through various elements to the base-emitter paths of the inverter transistors. The present invention could be readily substituted for these starting networks by connecting the terminals Y–Y' in place of the prior art starting network, the terminals X–X' across the collector-emitter path of one of the inverter transistors, and the terminals A–B to the input source. The starting circuit shown in FIGS. 1 and 2 connected in this manner will reliably start virtually all inverter circuits and then disconnect itself from the inverter once oscillation has been initiated in the inverter.

In summary, then, the present invention employs a starting network which is connected across the collector-emitter path of one of the inverter transistors to disconnect electrically the starting network from the inverter once the inverter begins to oscillate. Starting pulses are generated by charging capacitor 23 from the input source to a potential sufficient to breakdown a pnpn device 24 and thereby transmit the energy stored in the capacitor to the feedback loop of the inverter as the first starting pulse of a train of pulses similarly generated. Once the inverter begins to start, a second capacitor 29 is charged by the pulsating voltage across the collector-emitter path of transistor Q1. Capacitor 29 later discharges through the conductive collector-emitter path of transistor Q1 to charge capacitors 23 and 26 to potentials having polarities which back-bias pnpn device 24 and hold it cut-off. Device 24, which thus acts essentially as a switch, effectively removes or switches the starting network from the inverter to prevent interference by the starting network with the normal operation of the inverter.

The above-described arrangement is illustrative of the application of the principles of the invention. Other embodiments may be devised by those skilled in the art without departing from the spirit and scope thereof.

What is claimed is:

1. An inverter comprising first and second transistors each having their collector-emitter paths connected with a source of input potential and at least a portion of the primary winding of a transformer, a load connected to the secondary winding of said transformer, a feedback network regeneratively coupled to the base-emitter paths of said transistors and said transformer to drive said transistors alternately between the conductive and non-conductive states in oscillation, and a starting network connected across the collector-emitter path of said first transistor and to said source of input potential, said starting network including switching means for automatically connecting said starting network to said feedback network to supply a series of starting pulses whenever said inverter is not oscillating and automatically disconnecting said starting network from said feedback network whenever said inverter is oscillating, whereby the initiation of oscillation in said inverter is assured regardless of load.

2. An inverter comprising first and second transistors each having their collector-emitter paths connected with a source of input potential and at least a portion of the primary winding of a transformer, a load connected to the secondary winding of said transformer, a feedback network regeneratively coupled to the base-emitter paths of said transistors and said transformer to drive said transistors alternately between the conductive and non-conductive states in oscillation, a starting network comprising first and second capacitors, a semiconductor breakdown device serially connected between said source of input potential and said feedback network, a charging path for said first capacitor comprising means connecting said first capacitor intermittently across the collector-emitter path of said first transistor, a discharge path for said first capacitor comprising means serially connecting said first capacitor, the collector-emitter path of said first transistor, and said second capacitor to charge said second capacitor, and means connecting said second capacitor to said semiconductor breakdown device so that the potential stored in said second capacitor prevents breakdown of said semiconductor device whenever said inverter is in the normal mode of oscillation.

3. An inverter in accordance with claim 2 wherein said charging path comprises a first diode poled for conduction during the non-conductive intervals of said first transistor, and said discharging path comprises a second diode poled for conduction during the conductive intervals of said first transistor, whereby said first capacitor is charged substantially during the non-conductive intervals of said first transistor and said second capacitor is charged from the energy stored in said first capacitor during the conductive intervals of said first transistor.

4. An inverter in accordance with claim 2 comprising a resistor connected between said second capacitor and said breakdown device and a third capacitor serially connected with said resistor across said second capacitor, said third capacitor being charged to a potential of one polarity from said source of input potential during the starting interval of said inverter and charged to a potential of opposite polarity from the potential stored in said second capacitor when said inverter begins to oscillate to prevent breakdown of said semiconductor breakdown device by said source of input potential during the oscillatory mode of operation of said inverter.

5. An inverter in accordance with claim 2 comprising a series resistor-capacitor network, a parallel resistor-capacitor network, means connecting said series resistor-capacitor network from the output terminal of said breakdown device to one terminal of said feedback network, and means connecting said parallel resistor-capacitor network from the output terminal of said breakdown device to the other terminal of said feedback network, whereby bursts of starting pulses are applied to said feedback network to start said inverter and eliminate substantial heating damage to the components of said inverter.

6. An inverter comprising first and second transistors each having their collector-emitter paths connected with a source of input potential and at least a portion of the primary winding of a transformer, a timing network comprising a serially connected inductor and first capacitor regeneratively coupled to the base-emitter paths of said transistors and said transformer to drive said transistors alternately between the conductive and non-conductive states in oscillation, a starting network comprising second and third capacitors, a semiconductor breakdown device, a series network comprising a first resistor and a fourth capacitor, a parallel network comprising a second resistor and a fifth capacitor, a charging path for said second capacitor including means for connecting said second capacitor intermittently across the collector-emitter path of said first transistor, a discharging path for said second capacitor comprising means for serially connecting said second capacitor, the collector-emitter path of said first transistor, and said third capacitor to charge said third capacitor, means connecting said third capacitor to said source of input potential and the input terminal of said semiconductor breakdown device, means serially connecting said third capacitor, the input and output terminals of said semiconductor breakdown device, and said series network comprising said first resistor and said fourth capacitor, and means serially connecting said series network comprising said first resistor and said fourth capacitor, said parallel network comprising said second resistor and said fifth capacitor, and said first capacitor to provide bursts of series of starting pulses to start said inverter without damage to the components of said inverter and effectively remove said starting network from said inverter whenever said inverter assumes its normal mode of operation.

References Cited

UNITED STATES PATENTS

| | | | |
|---|---|---|---|
| 3,345,580 | 10/1967 | Tracy | 331—113 X |
| 3,369,195 | 2/1968 | Zollinger et al. | 331—113 |
| 3,411,108 | 11/1968 | Phillips | 331—113 |
| 3,412,313 | 11/1968 | Compoly | 321—14 |
| 3,444,481 | 5/1969 | Fisher | 321—455 |

J D MILLER, Primary Examiner

W. H. BEHA, Jr., Assitant Examiner

U.S. Cl. X.R.

321—4, 14, 113